United States Patent
Sanctis et al.

(10) Patent No.: US 12,386,940 B2
(45) Date of Patent: Aug. 12, 2025

(54) TWO-FACTOR AUTHENTICATION INTEGRATING DYNAMIC QR CODES

(71) Applicant: Bank of America Corporation, Charlotte, NC (US)

(72) Inventors: Jennifer Sanctis, Charlotte, NC (US); Taylor Farris, Hoboken, NJ (US); Vishwas Korde, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 315 days.

(21) Appl. No.: 18/214,016

(22) Filed: Jun. 26, 2023

(65) Prior Publication Data

US 2024/0427871 A1 Dec. 26, 2024

(51) Int. Cl.
G06F 21/00 (2013.01)
G06F 21/32 (2013.01)
G06F 21/36 (2013.01)

(52) U.S. Cl.
CPC .............. G06F 21/36 (2013.01); G06F 21/32 (2013.01)

(58) Field of Classification Search
CPC ................................. G06F 21/36; G06F 21/32
See application file for complete search history.

(56) References Cited

U.S. PATENT DOCUMENTS

| | | |
|---|---|---|
| 8,281,375 B2 | 10/2012 | von Krogh |
| 8,572,684 B1 | 10/2013 | Sama |
| 9,106,645 B1 | 8/2015 | Vadlamani |
| 9,124,433 B2 | 9/2015 | Marien et al. |
| 9,203,824 B1 | 12/2015 | Nunn et al. |
| 9,213,820 B2 | 12/2015 | Farraro |
| 9,262,759 B2 | 2/2016 | Hanson et al. |
| 9,294,476 B1 | 3/2016 | Lurey et al. |
| 9,384,481 B2 | 7/2016 | Hanson et al. |
| 9,589,123 B2 | 3/2017 | Farraro |

(Continued)

FOREIGN PATENT DOCUMENTS

| | | |
|---|---|---|
| CN | 109547196 | 3/2019 |
| WO | WO2017039354 | 3/2017 |

OTHER PUBLICATIONS

Alex Perala, "Apple Exploring Face ID for Apple Watch 4," https://mobileidworld.com/face-id-for-apple-watch-4-904233/, Mobile ID World, Apr. 24, 2018.

(Continued)

*Primary Examiner* — William A Corum, Jr.
(74) *Attorney, Agent, or Firm* — Weiss & Arons LLP

(57) ABSTRACT

A method for authenticating a user into a session on an entity application running on a computing device is provided. The method may include using a mobile device of the user as an authenticator. The method may include capturing by the mobile device, a dynamic quick response ("QR") code displayed on the computing device. The method may include transmitting the dynamic QR code, pre-authorized user credentials and a facial image of the user captured within a pre-determined time to a central server for authentication. The transmitting may be for verifying the user of the computing device being the user of the mobile device. In response to the verifying, via the central server, the dynamic QR code, the pre-authorized user credentials and the facial image, authenticating the user into the session on the entity application on the computing device.

20 Claims, 7 Drawing Sheets

(56) References Cited

U.S. PATENT DOCUMENTS

| | | | |
|---|---|---|---|
| 9,646,300 | B1 | 5/2017 | Zhou et al. |
| 9,673,975 | B1 | 6/2017 | Machani |
| 9,768,963 | B2 | 9/2017 | Chu et al. |
| 9,811,818 | B1 | 11/2017 | Xing |
| 9,830,589 | B2 | 11/2017 | Xing |
| 9,832,019 | B2 | 11/2017 | Choi |
| 9,871,785 | B1 | 1/2018 | Triandopoulos et al. |
| 9,906,524 | B2 | 2/2018 | Shibata et al. |
| 9,930,034 | B2 | 3/2018 | Ekambaram et al. |
| 10,122,719 | B1 | 11/2018 | Vltavsky et al. |
| 10,158,489 | B2 * | 12/2018 | Shastri ............... H04L 63/0853 |
| 10,587,613 | B2 | 3/2020 | Ledesma |
| 11,296,874 | B2 | 4/2022 | Harris et al. |
| 2006/0021003 | A1 | 1/2006 | Fisher et al. |
| 2009/0097459 | A1 | 4/2009 | Jendbro et al. |
| 2009/0300738 | A1 | 12/2009 | Dewe et al. |
| 2011/0197266 | A1 | 8/2011 | Chu et al. |
| 2013/0212286 | A1 | 8/2013 | Krishnakumar et al. |
| 2013/0219479 | A1 | 8/2013 | DeSoto et al. |
| 2013/0283397 | A1 | 10/2013 | Griffin |
| 2014/0129733 | A1 | 5/2014 | Klais |
| 2014/0173695 | A1 | 6/2014 | Valdivia |
| 2014/0333415 | A1 * | 11/2014 | Kursun ............... G06Q 30/00 340/5.83 |
| 2014/0351911 | A1 | 11/2014 | Yang et al. |
| 2015/0041530 | A1 | 2/2015 | Burkhart et al. |
| 2015/0088760 | A1 | 3/2015 | Meurs |
| 2015/0234891 | A1 | 8/2015 | Liu |
| 2015/0261948 | A1 | 9/2015 | Marra et al. |
| 2016/0057123 | A1 | 2/2016 | Jiang et al. |
| 2016/0162873 | A1 | 6/2016 | Zhou et al. |
| 2016/0255161 | A1 | 9/2016 | Lim et al. |
| 2016/0294817 | A1 | 10/2016 | Tan et al. |
| 2016/0337346 | A1 | 11/2016 | Momchilov et al. |
| 2017/0032370 | A1 | 2/2017 | Beltramino et al. |
| 2017/0083909 | A1 | 3/2017 | Mork et al. |
| 2017/0249628 | A1 | 8/2017 | Douglas et al. |
| 2017/0346851 | A1 | 11/2017 | Drake |
| 2018/0359635 | A1 | 12/2018 | Lerner |
| 2019/0164167 | A1 | 5/2019 | Embree |
| 2019/0174304 | A1 | 6/2019 | Tunnell et al. |
| 2019/0303556 | A1 | 10/2019 | Jain et al. |
| 2020/0068029 | A1 | 2/2020 | Lim et al. |
| 2020/0074070 | A1 | 3/2020 | Boodaei |
| 2020/0092272 | A1 | 3/2020 | Eisen et al. |
| 2020/0092287 | A1 | 3/2020 | Cano et al. |
| 2020/0128594 | A1 | 4/2020 | Shantharam et al. |
| 2020/0143375 | A1 | 5/2020 | Gurunathan et al. |
| 2020/0233949 | A1 | 7/2020 | Xia et al. |
| 2020/0351264 | A1 | 11/2020 | Pellizzer et al. |
| 2020/0404019 | A1 | 12/2020 | Drake |
| 2021/0073359 | A1 | 3/2021 | Boodaei et al. |
| 2022/0004617 | A1 * | 1/2022 | Irwin, III ............... G06F 21/40 |
| 2022/0086134 | A1 * | 3/2022 | Xie ...................... H04L 67/141 |
| 2022/0095006 | A1 | 3/2022 | Seed et al. |
| 2022/0150237 | A1 | 5/2022 | Canfield et al. |
| 2023/0169381 | A1 | 6/2023 | Subramanian |
| 2023/0284013 | A1 | 9/2023 | Schmidt |
| 2023/0419067 | A1 | 12/2023 | Wu et al. |

OTHER PUBLICATIONS

Eric Weiss, "Apple Patent Could Bring Face ID to Apple Watch," https://mobileidworld.com/biometrics-news-apple-patent-could-bring-face-id-apple-watch-111906/, Mobile ID World, Nov. 19, 2019.

"Apple Patent Points to Face ID coming to Apple Watch along with Band Sensors to Analyze Sports Performance and More," https://www.patentlyapple.com/patentlyapple/2018/03/apple-patent-points-to-face-id-coming-to-apple-watch-along-with-bandsensors-to-analyze-sports-performance-and-more.html, Patently Apple, Jun. 9, 2020.

Benjamin Mayo, "Rumor: Apple Developing Touch ID fingertip Biometrics for Apple Watch, Series 2 will not Support WatchOS 7," https://9to5mac.com/2020/03/27/rumor-apple-developing-touch-id-fingerprint-biometrics-for-apple-watch-series-2-will-not-support-watchos-7/, Word Press.com VIP, Mar. 27, 2020.

E. Grosse et al., "Authentication at Scale," in IEEE Security & Privacy, vol. 11, No. 1, pp. 15-22, Jan.-Feb. 2013.

F. Aloul et al., "Two Factor Authentication Using Mobile Phones," 2009 IEEE/ACS International Conference on Computer Systems and Applications, 2009, pp. 641-644.

Shah, Syed W., and Salil S. Kanhere, "Recent Trends in User Authentication—a Survey," IEEE Access 7 (2019): 112505-112519 (Year: 2019).

"How to Scan a QR Code in a Photo Google Lens," https://seniortechclub.com/nuggets/how-to-scan-a-qr-code-in-a-photo-using-google-lens/, pp. 1-5, 2020.

* cited by examiner

TWO-FACTOR AUTHENTICATION INTEGRATING DYNAMIC QR CODES

FIELD OF TECHNOLOGY

Aspects of the disclosure relate to secure authentication into a computer application.

BACKGROUND OF THE DISCLOSURE

Entry into a computer application is usually secured by an authentication method. Relatively simple authentication methods require a user to enter a username and password. Upon entry of the username and password, the user may be allowed entry into the computer application.

More complicated authentication methods include two-factor authentication. Two-factor authentication requires a username and password as well as another form of authentication. The second factor of authentication may include entry of an additional data element after entering the username and password. The additional data element may be transmitted, substantially contemporaneously with the user authentication, to the user. Adding an additional data element manually is more time consuming than simple authentication methods.

It would be desirable, therefore, to provide two-factor authentication methods that do not require manual entry of an additional data element, such as by capturing a displayed image to leverage two-factor authentication.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
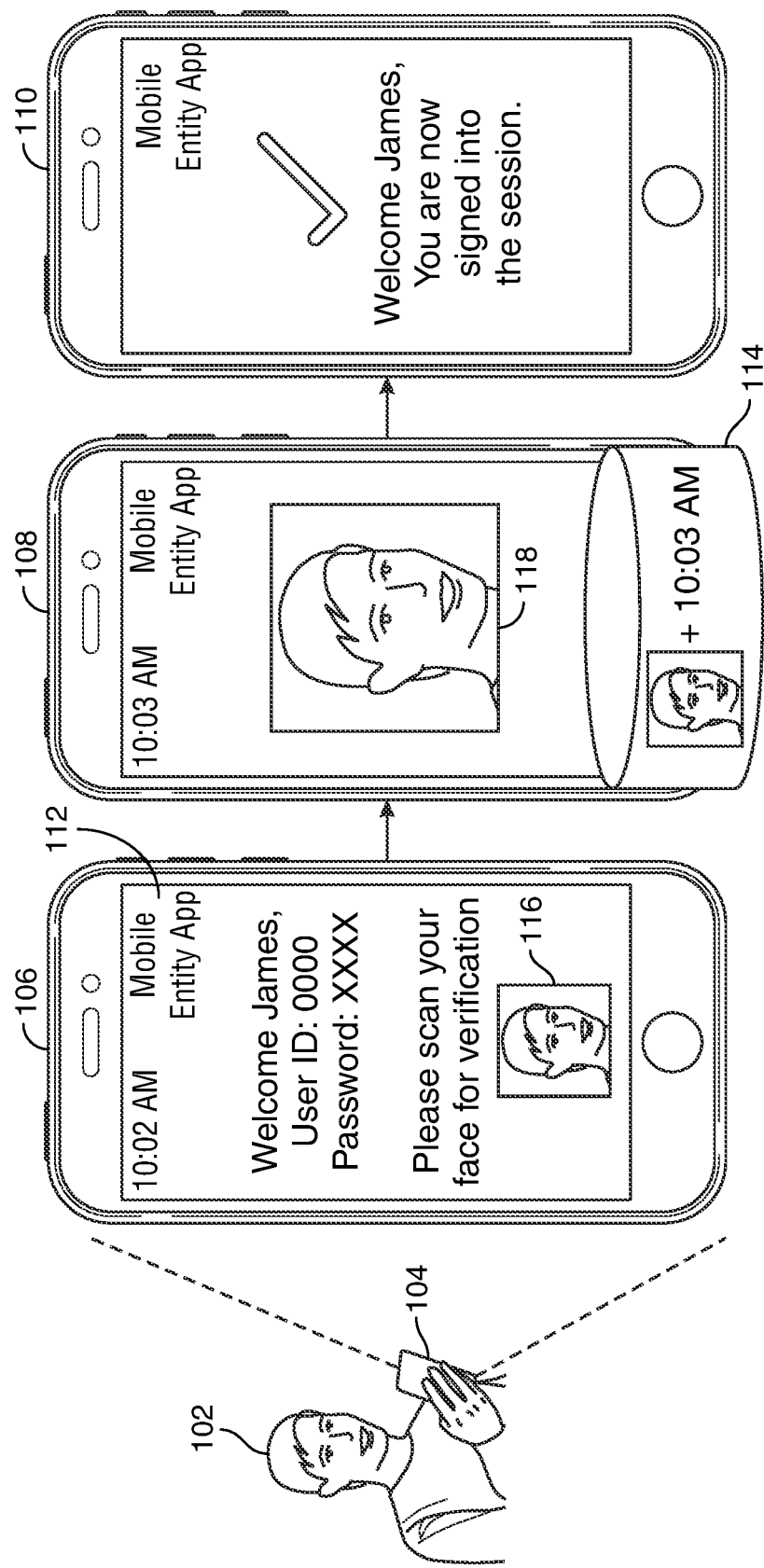
FIG. 1 shows an illustrative diagram in accordance with principles of the disclosure.

A system for authenticating a user into a secure session on an entity application running on a computing device is provided. The entity application may be running on a web browser on the computing device. The session may be a secure session for viewing and editing data associated with the user's account. The secure session may be for performing transactions, transferring of data and/or funds or any other suitable activity associated with the user's account.

The entity application may be associated with an entity. The entity may have an entity application that may be accessed on a desktop computer and on mobile computing devices. Users of the entity may have an account that may be accessed via the entity application. The account authorization data may be the same for both the entity app running on a desktop computer and for the entity app running on the mobile device. Users may be required to login with account authorization data for each computing device.

The system may include a first entity application running on a first computing device. The first entity application may be configured to display a dynamic quick response ("QR") code on a UI of the first computing device for initiating a session between a user and the first entity application.

The first entity application may be accessed as a web application on the internet. The first entity application may be accessed via selecting a uniform resource locator ("URL") that links to the first entity application. The first entity application may be accessed by inputting the URL in a web browser.

In some embodiments, the first entity application may be an app that is accessible without the internet.

A user may have an account profile in the first entity application. The user may only access the profile and perform transactions following authentication of the user.

The system may include a second entity application running on a second computing device. The second computing device may be a mobile device. The second entity application may be the same application as the first entity application but may be designed for a mobile device.

It should be appreciated that the first computing device may be a desktop computer. The second computing device may be a mobile device. In some embodiments, the first computing device may be the mobile device and the second computing device may be the desktop computer.

Each user may have one account profile that applies for each of the first entity application and the second entity application. Each user may need to authenticate access to the account profile on each computing device.

The user may be required to authenticate into each of the entity applications running on the different computing devices.

The system may include a central server. The central server may run and process all activity occurring at both the first entity application and the second entity application.

The system may leverage a pre-authentication of the user on a session at the second entity application as a first-factor of authentication for the user.

The user may be pre-authenticated into a session within the second entity application. The pre-authentication may include capturing a facial image of the user of the second computing device. The pre-authentication may also include tagging a timestamp to the facial image of a time of the capturing of the facial image. The pre-authentication may further include confirming that the facial image matches a stored facial image within an account profile of the user of the second computing device.

When an initiation of a session is attempted at the first computing device and the UI displays a QR code, the second computing device may be configured to capture the QR code displayed on the first computing device. The QR code may be used as a second factor of authentication.

The QR code may be a static QR code. The QR code may be a dynamic QR code. The QR code, in some embodiments, may be a graphical image that may be unique for each request for authentication into a secure session.

The central server may generate the QR code. The second computing device, following the capturing of the QR code, may transmit the QR code to the central server for authenticating into the secure session on the first computing device.

The QR code, in some embodiments, may be a graphical image embedded with a uniform resource locator. The URL may be a short URL that may be redirectable. The short URL may redirect to a second URL. The second URL may be continuously changed.

The short URL may redirect the mobile device to a webpage that may include an instruction to authenticate user access to the secure session. The short URL may redirect the mobile device to a webpage that may include an instruction to deny user access to the secure session.

In some embodiments, the type of instruction included in the webpage may be based on the time period of the capturing of the dynamic QR code. When the capturing occurs within a pre-determined time period immediately following the generating of the QR code, the webpage may include an instruction to authenticate. When the capturing occurs following the time period, the webpage may include an instruction to deny access.

The second computing device may be further configured to store the dynamic QR code at the second computing device. The second computing device may be further configured to transmit authentication data to the central server for authenticating the user at the first computing device. The authentication data may include the dynamic QR code, the pre-authorized user credentials stored on the second computing device and the facial image of the user.

The authenticating of the user may enable initiating the session within the first entity application on the first computing device. The session may be associated with an account profile of the user at the first entity application.

The central server may be configured to receive the authentication data. The central server may compare the dynamic QR code to the dynamic QR code displayed at the first computing device. The central server may determine an authenticity of the pre-authorized user credentials. The central server may compare the facial image to the facial image stored within the account profile of the user.

The central server may verify each of the dynamic QR code, the facial image and the dynamic QR code. Following verification, the central server may further verify that the timestamp of the capturing of the facial image is within a threshold range of time of the capturing of the dynamic QR code.

In response to the verification of the timestamp, the central server may be configured to confirm that the user initiating the session at the first entity application is the user authenticated at the second entity application on the second computing device.

When the timestamp of the capturing of the facial image is not within the threshold range of time of the capturing of the dynamic QR code, the central server may trigger the second computing device to re-capture the facial image of the user of the second computing device.

In some embodiments, when the capturing of the facial image is not within the threshold range of time of the capturing of the dynamic QR code, the dynamic QR code may be ineffective. In this embodiment, prior to re-capturing the facial image, a new dynamic QR code may be generated.

The system may also include a third computing device. The third computing device may be a smartwatch. The third computing device may be any other smart mobile computing device.

It should be appreciated that each of the first computing device, the second computing device and the third computing device may be a part of an entity network running on the central server. The entity network may not be limited to one, two or three computing devices. The entity network may, in some embodiments, include four or more computing devices.

The third computing device may include a one-time password ("OTP") application. The OTP application may be a part of the entity network operated by the central server.

The OTP application may be resident on and/or associated with the third computing device. The third computing device may be a smartwatch.

The second computing device may be in electronic communication with the third computing device.

When the second computing device captures the dynamic QR code, the second computing device may be configured to transmit an electronic communication to the third computing device. The electronic communication may include a request for a generation, by the OTP application, of an OTP.

The generating of the OTP may be an additional layer of securing authentication of the user at the entity application.

The third computing device may be configured to, in response to a receipt of the request, generate, by the OTP application, the OTP and transmit it to the second computing device.

The OTP may be displayed on a face of the smartwatch. The OTP may expire after a predetermined amount of time after the generating. The smartwatch may display a countdown of a number of seconds until the OTP will expire. The countdown may be underneath, or, alternatively, on top of the OTP display. The countdown may take into account the transmission delay between the second computing device, i.e.—a smartphone and the smartwatch. The countdown may include the transmission delay and a static amount of time. The amount of time may be a number of seconds.

The second computing device may be configured to trigger an input of the OTP. The user may manually input the OTP into the second computing device.

The second computing device may be further configured to transmit the OTP together with the dynamic QR code, the pre-authorized user credentials and the facial image to the central server for verification.

The OTP generation at the smartwatch, the authentication methods using the smartwatch, and communication between the smartwatch and the mobile device may include systems and methods described in U.S. patent application Ser. No. 16/929,239 filed on Jul. 15, 2020, now U.S. Pat. No. 11,296,874 which is hereby incorporated by reference herein in its entirety.

It should be appreciated that in some embodiments, in order to authenticate the user into the session on the first computing device, the mobile device may perform as the authenticator for the user at the first computing device. The mobile device may verify, via the central server, the facial image, the dynamic QR code, and the user credentials. When any one or more are not verified, the user may not be authenticated into the session.

It should be appreciated that the authentication into the secure session leveraging the mobile device may be a two-factor authentication. In some embodiments, the authentication may be a three-factor authentication. The dynamic QR code, the facial image, the pre-authorized user credentials and the OTP may all be factors of authentication to the secure session running on a computing device.

A method for authenticating a user into a secure session on an entity application running on a computing device is provided. The authenticating may be leveraged using a mobile device of the user as an authenticator. The computing device and the mobile device may be a part of an entity network that may be operated by a central server. The computing device and the mobile device may be in electronic communication with the central server.

The method may include generating, via the central server, a dynamic QR code. The dynamic QR code may be generated in response to a request to authenticate user access to the secure session. The dynamic QR code may include a graphical display that, when parsed by a QR code reader, identifies a short URL that is redirectable.

The QR code reader may be an application running on the mobile device. The QR code reader may be an application executed by a processor on the mobile device. The QR code reader may be executed at the central server.

The method may further include, displaying the dynamic QR code on a user interface ("UI") of the computing device.

The method may further include capturing, by the mobile device, the dynamic QR code. In response to the capturing, the method may include parsing the QR code by the QR code reader.

It should be appreciated that the short URL embedded in the dynamic QR code may be redirectable. When the dynamic QR code is captured by the mobile device within a time period immediately following the generating of the QR code, the central server may be configured to direct the mobile device to a first website. The first website may include an instruction. The first website, when accessed, may instruct the central server to authenticate the user to the secure session.

The time period may be one, two, three, four or five seconds. The time period may be up to ten seconds. The time period may be a maximum of 15 seconds. The time period may include any suitable time period in accordance with the principles of the disclosure.

When the dynamic QR code is captured after the time period has lapsed, the central server is configured to direct the mobile device to a second website. The second website may include an instruction. The second website, when accessed, may instruct the central server to deny the request to authenticate the user to the secure session.

It should be appreciated that when the time period has lapsed and the user is denied access to the secure session, the computing device may be enabled to trigger the central server to re-generate a dynamic QR code for capturing.

The method may include following the parsing, redirecting a web browser of the mobile device to the first website when the dynamic QR code is captured within the time period.

The method may include following the parsing, redirecting the web browser of the mobile device to the second website, when the dynamic QR code is captured after the time period has lapsed.

The method may further include transmitting the instruction from either the first website or the second website to the central server.

Following the transmitting of the instruction, the method may include retrieving from secure storage on the mobile device pre-authorized user credentials for authentication of the user into an entity application running on the mobile device.

The method may also include retrieving a facial image of the user captured within a pre-determined time to the capturing of the dynamic QR code.

The method may further include transmitting the pre-authorized user credentials and the facial image to the central server. It should be appreciated that the transmitting may be for verifying the user of the computing device being the user of the mobile device.

The method may further include, in response to the verifying of the pre-authorized user credentials and the facial image, determining based on the instruction, whether to authenticate or deny user access to the secure session.

The pre-authorized user credentials may be authorized at a first initiation session of the user into the entity application on the mobile device. Following the first initiation session, the pre-authorized user credentials may be stored for authenticating the user into each session on the entity application of the mobile device.

The method may further include, prior to authenticating the user into any session following the first initiation session, the method may include, capturing the facial image of the user of the mobile device. Following the capturing, the method may include tagging the facial image with a timestamp of the time of the capturing. The method may further include confirming that the facial image matches a stored facial image.

In response to the confirming, the method may include authenticating the computing device into the secure session on the mobile device. The user may access the secure session and perform transactions associated with the user's account and account profile.

The verifying by the central server further may further include scanning the timestamp of the facial image to verify the timestamp being within the pre-determined time to the capturing of the dynamic QR code.

When the timestamp is outside the pre-determined time, the method may include re-capturing the facial image of the user by the mobile device. Following the re-capturing, the method may include verifying by the central server that the facial image matches the stored facial image.

The pre-determined time may be a few seconds. The pre-determined time may be a window of time between one and ten minutes. The pre-determined time may be a few hours. The pre-determined time may be within a 12 to 24 hour window of time.

In some embodiments, when the facial image does not match the stored facial image, the method may include denying the user access to the session on the entity application running on the computing device.

It should be appreciated that when the instruction authorizes the central server to authenticate into the session, the central server may first verify the facial image and pre-authorized user credentials. When the facial image and/or pre-authorized user credentials are not accurate, the central server may deny user access to the secure session.

It should be appreciated that the computing device may be a desktop computer. The computing device may be a second mobile device. The computing device may be one of a laptop, tablet, iPad or any other suitable computing device.

It should be appreciated that the mobile device may be enabled to further authenticate the user to perform high-risk transactions during a session on another computing device. Additionally, activity relating to profile changes, administrative functions and high dollar transfers may also be authenticated leveraging the mobile device.

Additionally, when the mobile device is leveraged to authenticate the user into the session on one or more additional computing device(s), forms and documents may be enabled to be auto filled using data associated with the user that may be stored on the mobile device.

For each activity that may entail additional authentication, the entity application may authenticate the user by leveraging a mobile device of the user as the authenticator. The mobile device may capture the dynamic QR code that may be displayed on a UI of any one or more computing devices of the user. The mobile device may be configured to capture the dynamic QR code. The central server operating the entity application at each computing device may verify the dynamic QR code and authenticate the user at the computing device to perform the activity(ies).

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative diagram in accordance with principles of the disclosure.

Mobile device 104 may belong to or be associated with user 102. Mobile entity app 110 may be an app running on mobile device 104.

User 102 may be logged into the app and may access the app at any time. When the user is not using the app, after a pre-determined amount of time, the mobile entity app 110 may be triggered to activate a facial scanning application to scan the facial image of the user for authentication.

User 102 may not need to re-enter the user ID and password after each lapse of the pre-determined amount of time where the mobile entity app 110 is not in use. User 102 may need to scan user's 102 facial image for verification following each lapse of time.

At UI 106 of mobile device 104, user 102 may be prompted to capture a facial image of the user for verification, as shown at 116. At UI 108 of mobile device 104, a facial image scan may be performed, and the facial image of the user is captured and displayed at UI 108, as shown at 118.

Following the capturing of the facial image, the facial image and a timestamp of the time of capturing may be stored within memory of mobile device 104, as shown at 114.

At UI 110, user 102 may be authenticated into mobile entity app 112. Authentication may be displayed at UI 110 and user 102 may access the user's account.

In this exemplary diagram, the facial image of user 102 is captured at 10:03 am. User 102 authenticated into the mobile entity app 112 at 10:02 am. The timestamp at 114 is determined to be within the threshold range of time of the capturing of the facial image and therefore user 102 may be authenticated into the secure session at mobile entity app, as shown at 110.

Figure 2:
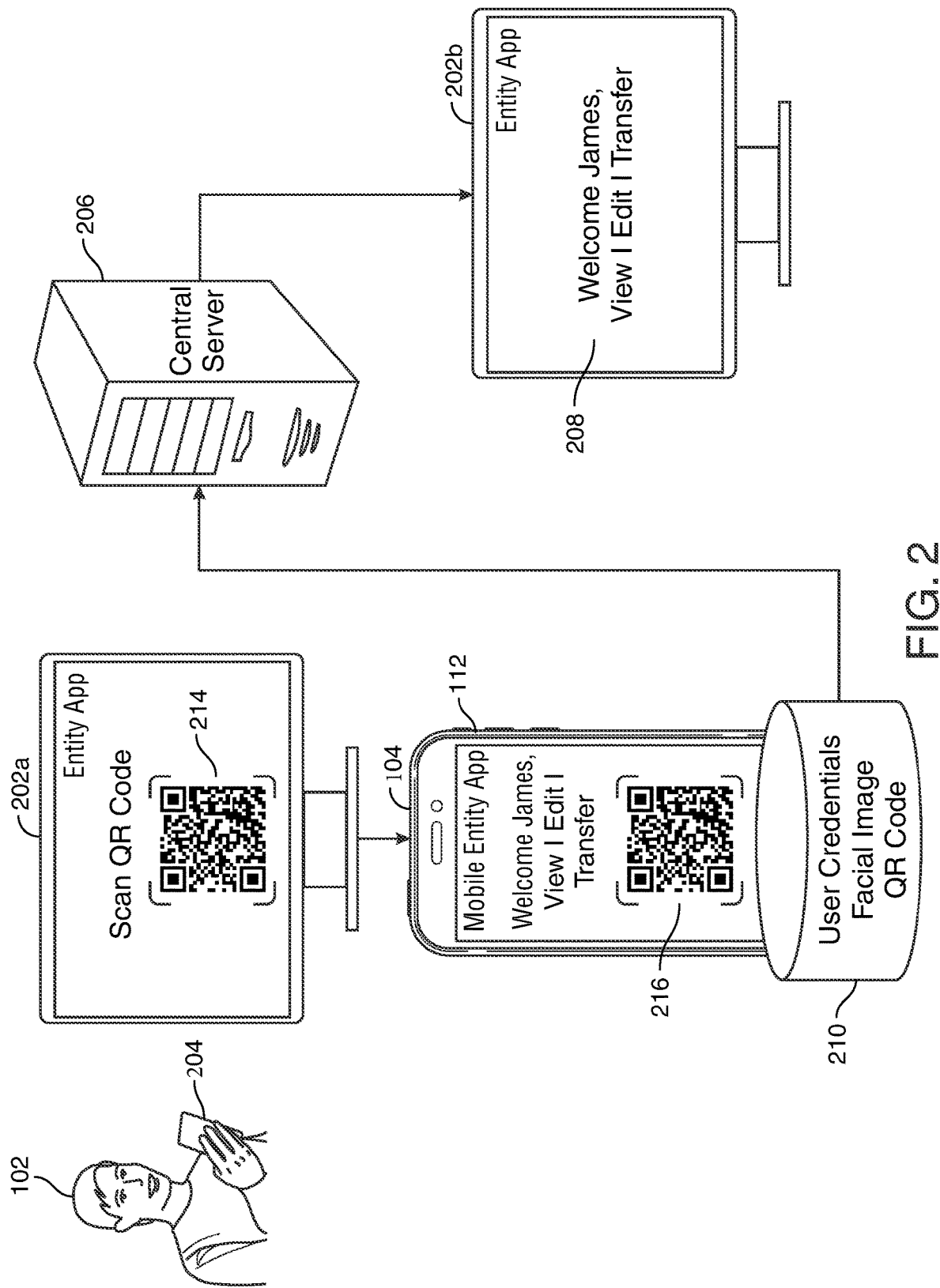
FIG. 2 shows an illustrative diagram in accordance with principles of the disclosure.

FIG. 2 shows an illustrative exemplary diagram of authentication on a computing device leveraging a mobile device as the authenticator.

User 102 may be holding mobile device 204. An enlarged view of the screen of mobile device 204 may be shown at 104.

Mobile entity app 112 may be running on mobile device 104 following authentication of the user at mobile device 104.

Computing device 202a, in this exemplary diagram, may be a desktop computer. User 102 may wish to access the entity application using computing device 202a.

The entity application 212 running on computing device 202a and the mobile entity application 112 running on mobile device 104 may be the same application. Both applications may be associated with one entity.

Each entity application may require authentication of the user, prior to accessing the user's account.

When two or more computing devices of user 102 are within close proximity to one another, one of the computing devices may be used to authenticate the user at the other computing device.

The UI of computing device 202a may display user login options. In some embodiments, the user may authenticate into a session by inputting a user ID and password. Following the user ID and password, the user may be prompted for input of at least one biometric.

In some embodiments, the user may leverage the user's mobile device for authentication. By leveraging the user's mobile device, the authentication may be significantly more secure. The authentication process may also be quicker than manual authentication of the user ID, password and input of one or more biometrics.

The mobile device may be already authenticated into the mobile entity application 112 running on the mobile device.

The UI on computing device 202a may display a dynamic QR code. The dynamic QR code may be generated via the central server. The dynamic QR code may be unique to the user of the entity application running on the computing device.

Mobile device 102 may capture the dynamic QR code, as shown at 216.

It should be appreciated that the capturing, via mobile device 104, of the dynamic QR code may be performed within mobile entity app 112.

When the user of mobile device 104 is not the user of computing device 202a, dynamic QR code 214 may be invalid, and the URL(s) may be inaccessible. Mobile device 104 may not be able to authenticate user 102 of computing device 202a.

Following the capturing of the dynamic QR code, the dynamic QR code may be stored temporarily on mobile device 104.

Mobile entity app 112 may retrieve the stored facial image from memory 210 at mobile device 104. Mobile entity app 112 may further determine whether the timestamp of the time of capturing of the facial image, is within the threshold range of time of the capturing of the dynamic QR code.

When the timestamp is within the threshold range of time, mobile entity app 112 may transmit authentication data of user 102 stored at mobile device 104. The authentication data may include the dynamic QR code, the facial image and pre-authorized user credentials to central server 206 for authentication.

Central server 206 may verify the authenticity of the authentication data in order to authenticate user 102 into a secure session at computing device 202.

Central server 206 may verify the timestamp of the facial image. When the timestamp is out of range, central server 206 may trigger entity app 112 to re-capture a facial image of user 102.

When the timestamp is within the range and the pre-authorized user credentials and dynamic QR code are verified, central server may authenticate user 102 into the secure session, as shown at UI 208 of computing device 202*b*.

Figure 3:
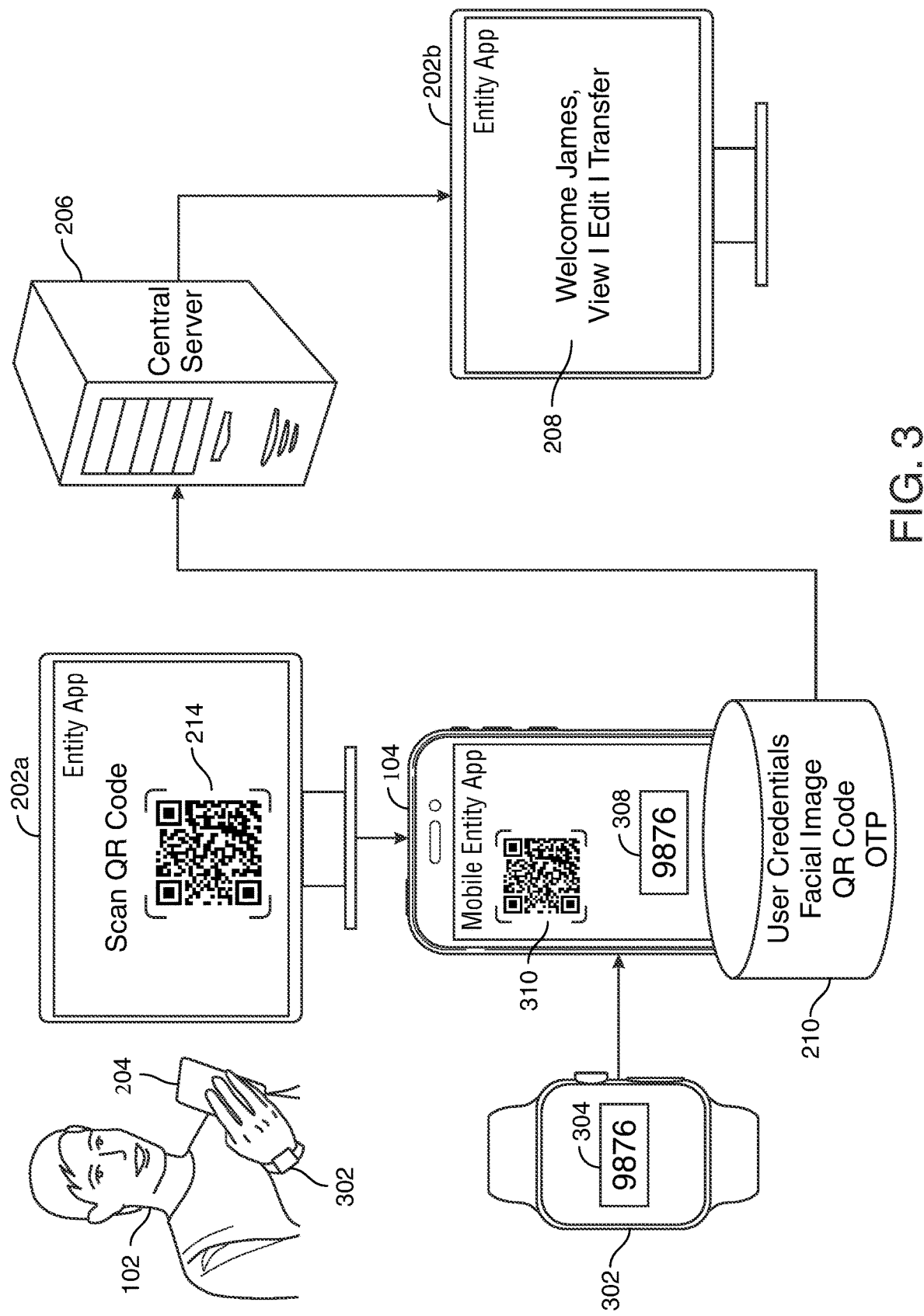
FIG. 3 shows an illustrative diagram in accordance with principles of the disclosure.

FIG. 3 shows an illustrative exemplary diagram of authentication on a computing device 202*a* leveraging a first mobile device 104 and a second mobile device 302 as authenticators.

As illustrated in FIG. 2, mobile device 104 captures dynamic QR code displayed on computing device 202*a*, as shown at 310. Following the capturing of the dynamic QR code, mobile device 104 may be triggered to transmit an electronic communication to another computing device of user 102.

The electronic communication may include a request to another computing device to generate an OTP for further verifying the user.

In this exemplary diagram, mobile device 104 may transmit the electronic communication to smartwatch 302 of user 102. Smartwatch 302 may have an OTP application associated with the entity running on smartwatch 302.

Following receipt of the electronic communication at smartwatch 302, smartwatch 302 may run the OTP application and generate an OTP 304. OTP 304 may automatically be transmitted to mobile device 104.

In some embodiments, OTP 304 may be displayed on mobile device 104. In some embodiments, OTP 304 may not be displayed on mobile device 104. OTP 304 may be stored at memory 306 within mobile device 104.

In some embodiments, OTP 304 may not be transmitted to mobile device 104. In this embodiment, user 102 may view OTP 304 on smartwatch 302 and manually input within the UI of the mobile entity application running on mobile device 104, as shown at 308.

Following input or receipt of OTP 304 at mobile device 104, mobile device 104 may transmit the OTP 304 and the authentication data associated with user 102 to central server 206 for verification.

Central server 206 may verify each of the authentication data and OTP 304. Following verification, user 102 may be authenticated into the secure session within entity application on computing device 202*b*.

Figure 4:
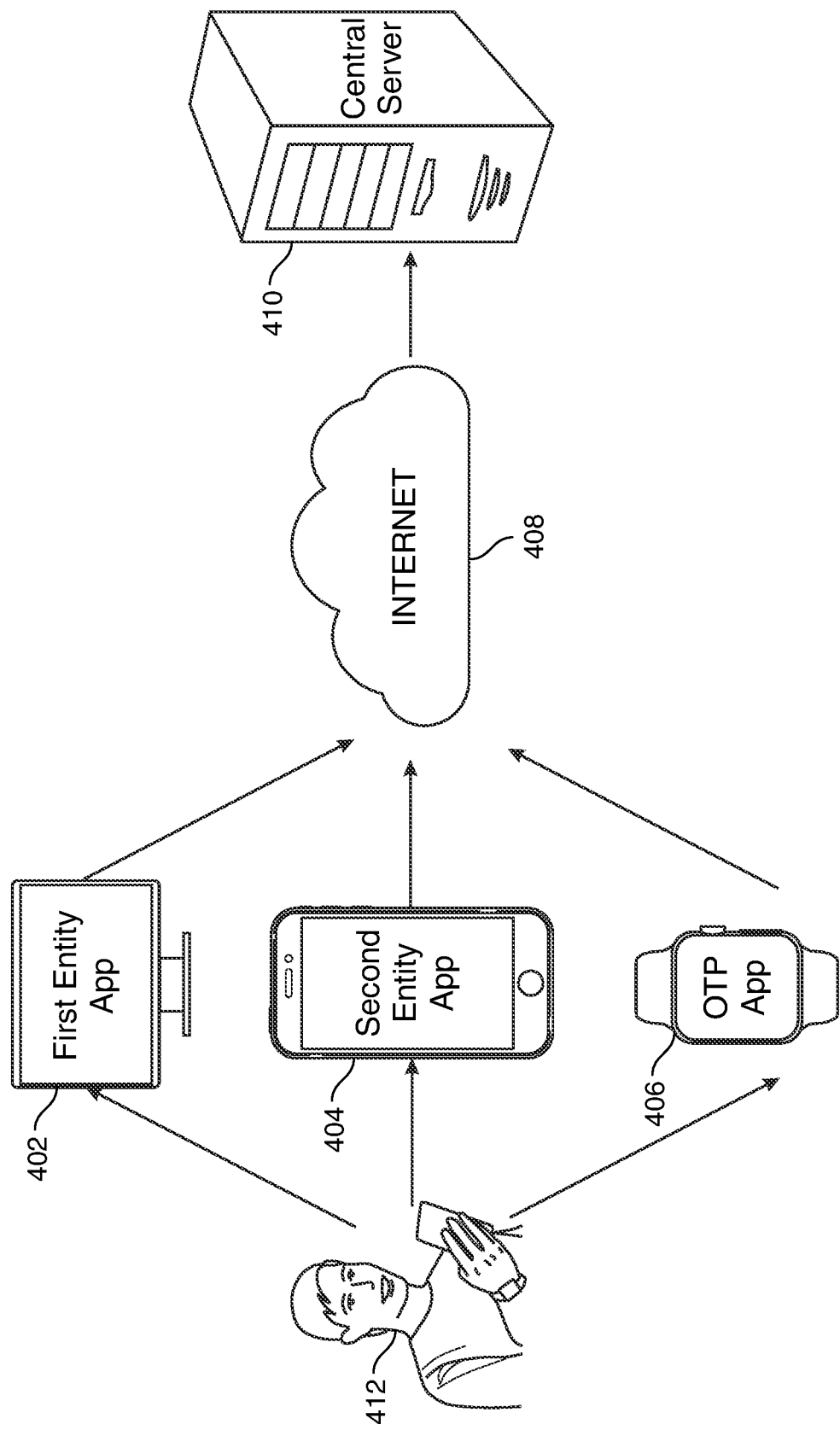
FIG. 4 shows an illustrative diagram in accordance with principles of the disclosure.

FIG. 4 shows a first computing device 402, a second computing device 404 and a third computing device 406. Each of computing devices 402, 404 and 406 may be associated with user 412.

Each of computing devices 402, 404 and 406 may be part of an entity network running on central server 410. Each of computing devices 402, 404 and 406 may connect to central server 410 via internet 408.

Each of computing devices 402-406 may have the entity application running on the computing device. The user may need to be authenticated at each entity application. User may leverage one or more of the computing devices to authenticate the user.

It should be appreciated that user 412 may have additional computing devices not illustrated. Each additional computing device may have the entity application running on the computing device.

Figure 5:
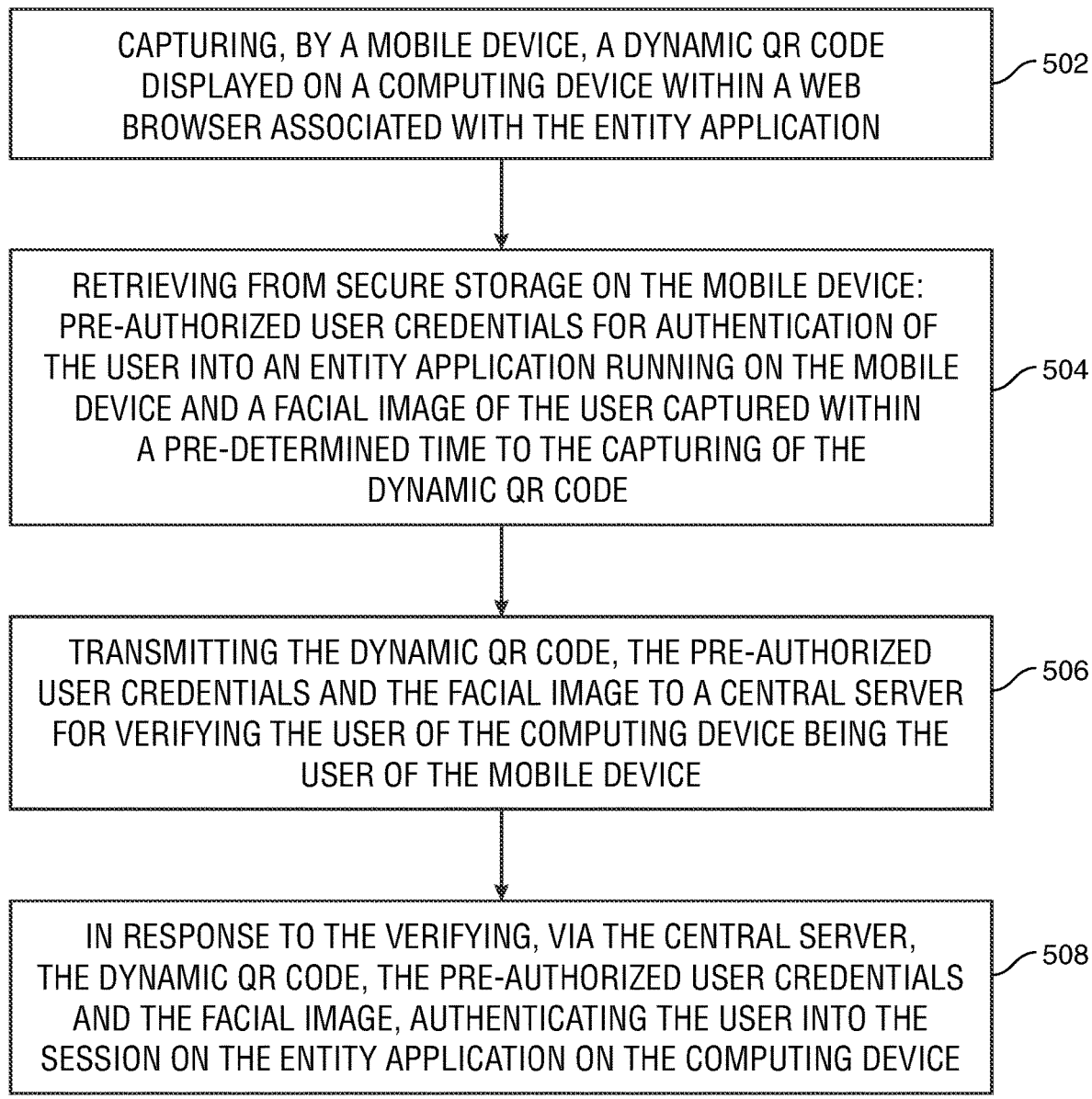
FIG. 5 shows an illustrative flow chart in accordance with principles of the disclosure.

FIG. 5 shows an illustrative flow chart of a method for authenticating into an entity application in accordance with principles of the disclosure.

At 502 the method step may include capturing, by a mobile device, a dynamic QR code displayed on a computing device. The dynamic QR code may be displayed within a web browser associated with an entity application. The computing device and the mobile device may be associated with a user.

At 504, the method step may include, retrieving from secure storage on the mobile device, authentication data of the user of the mobile device. The authentication data may include pre-authorized user credentials for authentication of the user into the entity application. The entity application may be a mobile entity application running on the mobile device.

The authentication data may include a facial image of the user captured within a pre-determined time to the capturing of the dynamic QR code.

At 506, the method step may include transmitting the dynamic QR code and the authentication data to the central server. The central server may verify the user of the computing device as being the user of the mobile device.

At 508, the method step may include, in response to the verifying, via the central server, of the dynamic QR code and the authentication data, authenticating the user into the session on the entity application. The session on the entity application may be running on the computing device.

Figure 6:
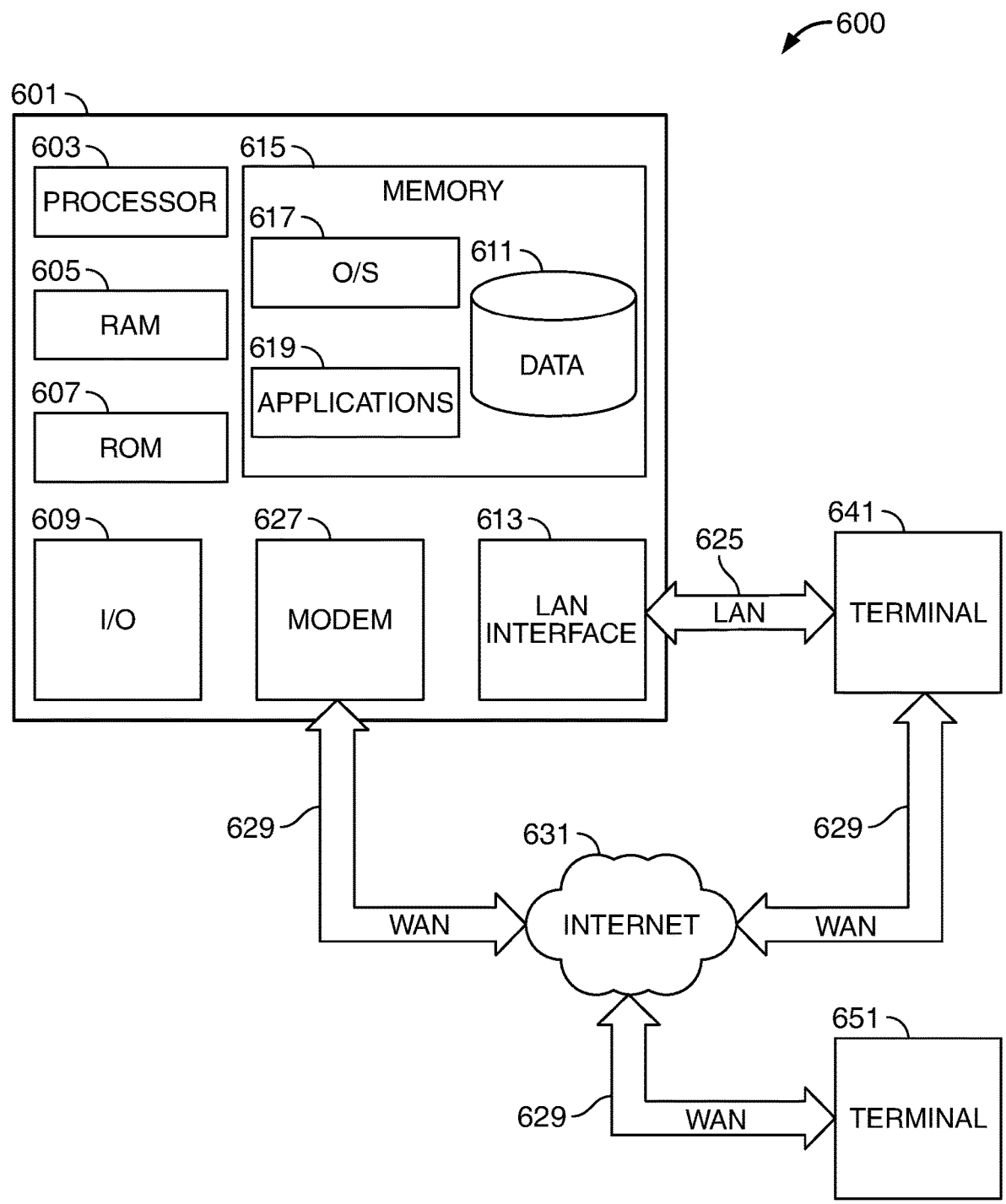
FIG. 6 shows an illustrative block diagram in accordance with principles of the disclosure.

FIG. 6 shows an illustrative block diagram of system 600 that includes computer 601. Computer 601 may alternatively be referred to herein as an "engine," "server" or a "computing device." The computing system may include one or more computer servers 601. Computer 601 may be any computing device described herein, such as the central server, the first computing device, the second computing device and the third computing device. The Elements of system 600, including computer 601, may be used to implement various aspects of the systems and methods disclosed herein.

Computer 601 may have a processor 603 for controlling the operation of the device and its associated components, and may include RAM 605, ROM 607, input/output circuit 609, and a non-transitory or non-volatile memory 615. Machine-readable memory may be configured to store information in machine-readable data structures. Other components commonly used for computers, such as EEPROM or Flash memory or any other suitable components, may also be part of the computer 601.

The memory 615 may be comprised of any suitable permanent storage technology—e.g., a hard drive. The memory 615 may store software including the operating system 617 and application(s) 619 along with any data 611 needed for the operation of computer 601. Memory 615 may also store videos, text, and/or audio assistance files. The data stored in Memory 615 may also be stored in cache memory, or any other suitable memory.

Input/output ("I/O") module 609 may include connectivity to a microphone, keyboard, touch screen, mouse, and/or stylus through which input may be provided into computer 601. The input may include input relating to cursor movement. The input/output module may also include one or more speakers for providing audio output and a video display device for providing textual, audio, audiovisual, and/or graphical output. The input and output may be related to computer application functionality.

Computer 601 may be connected to other systems via a local area network (LAN) interface 613. Computer 601 may operate in a networked environment supporting connections to one or more remote computers, such as terminals 641 and 651. Terminals 641 and 651 may be personal computers or servers that include many or all of the elements described above relative to computer 601.

When used in a LAN networking environment, computer 601 is connected to LAN 625 through a LAN interface 613 or an adapter. When used in a WAN networking environment, computer 601 may include a modem 627 or other means for establishing communications over WAN 629, such as Internet 631.

In some embodiments, computer 601 may be connected to one or more other systems via a short-range communication network (not shown). In these embodiments, computer 601 may communicate with one or more other terminals 641 and 651, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 619, which may be used by computer 601, may include computer executable instructions for invoking functionality related to communication, such as e-mail, Short Message Service (SMS), and voice input and speech recognition applications. Application program(s) 619 (which may be alternatively referred to herein as "plugins," "applications," or "apps") may include computer executable instructions for invoking functionality related to performing various tasks. Application programs 619 may utilize one or more algorithms that process received executable instructions, perform power management routines or other suitable tasks.

Application programs 619 may include the first entity application, the second entity application and the OTP application.

Application program(s) 619 may include computer executable instructions (alternatively referred to as "programs"). The computer executable instructions may be embodied in hardware or firmware (not shown). Computer 601 may execute the instructions embodied by the application program(s) 619 to perform various functions.

Application program(s) 619 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 619 may include one or more algorithms that may be used to implement features of the disclosure.

The invention may be described in the context of computer-executable instructions, such as applications 619, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 601 and/or terminals 641 and 651 may also include various other components, such as a battery, speaker, and/or antennas (not shown). Components of computer system 601 may be linked by a system bus, wirelessly or by other suitable interconnections. Components of computer system 601 may be present on one or more circuit boards. In some embodiments, the components may be integrated into a single chip. The chip may be silicon-based.

Terminal 651 and/or terminal 641 may be portable devices such as a laptop, cell phone, Blackberry™, tablet, smartphone, or any other computing system for receiving, storing, transmitting and/or displaying relevant information. Terminal 651 and/or terminal 641 may be one or more user devices. Terminals 651 and 641 may be identical to computer 601 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 7:
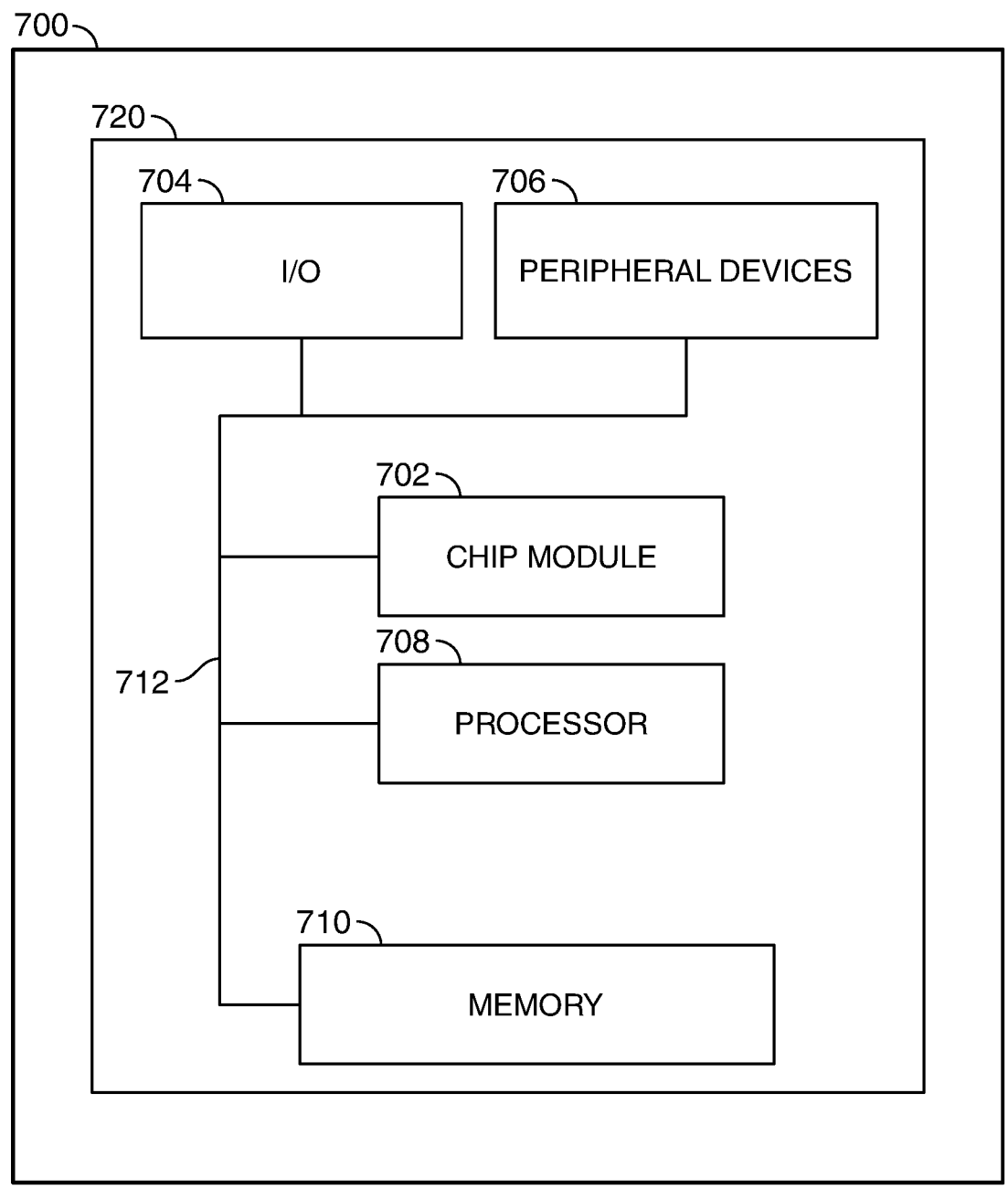
FIG. 7 shows an illustrative apparatus that may be configured in accordance with principles of the disclosure.

FIG. 7 shows illustrative apparatus 700 that may be configured in accordance with the principles of the disclosure. Apparatus 700 may be a computing device. Apparatus 700 may include chip module 702, which may include one or more integrated circuits, and which may include logic configured to perform any other suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable media or devices; peripheral devices 706, which may include counter timers, real-time timers, power-on reset generators or any other suitable peripheral devices; logical processing device 708, which may compute data structural information and structural parameters of the data; and machine-readable memory 710.

Machine-readable memory 710 may be configured to store in machine-readable data structures: machine executable instructions, (which may be alternatively referred to herein as "computer instructions" or "computer code"), applications such as applications 619, signals, and/or any other suitable information or data structures.

Components 702, 704, 706, 708 and 710 may be coupled together by a system bus or other interconnections 712 and may be present on one or more circuit boards such as circuit board 720. In some embodiments, the components may be integrated into a single chip. The chip may be silicon-based.

Thus, systems and methods for authenticating a user into a session on a computing device using a mobile device as an authenticator is provided. Persons skilled in the art will appreciate that the present invention can be practiced by other than the described embodiments, which are presented for purposes of illustration rather than of limitation.

What is claimed is:

1. A method for authenticating into a secure session on an entity application running on a computing device, the authenticating using a mobile device of a user as an authenticator, the computing device and the mobile device in electronic communication with a central server, the method comprising:
    generating, via the central server, a dynamic quick response ("QR") code in response to a request to authenticate user access to the secure session, the dynamic QR code including a graphical display that, when parsed by a QR code reader, identifies a short URL;
    displaying the dynamic QR code on a user interface ("UI") of the computing device;
    capturing the dynamic QR code, by the mobile device, within a time period immediately following the generating of the dynamic QR code;
    in response to the capturing, parsing the dynamic QR code;
    following the parsing, redirecting a web browser of the mobile device to a first website, the first website, when accessed, instructing the central server to authenticate the user to the secure session;
    transmitting the instruction to the central server; retrieving, from secure storage on the mobile device: pre-authorized user credentials for authentication of the user into an entity application running on the mobile device; and
    a facial image of the user captured within a pre-determined time to the capturing of the dynamic QR code;
    transmitting the dynamic QR code, the pre-authorized user credentials and the facial image to the central server, the transmitting for verifying the user of the computing device being the user of the mobile device; and
    in response to the verifying of the pre-authorized user credentials and the facial image, and in response to the instruction, authenticating, via the central server, the computing device into the secure session.

2. The method of claim 1 wherein the dynamic QR code, when captured after the time period has lapsed, directs the mobile device to a second website, the second website, when accessed, instructs the central server to deny the request to authenticate the user to the secure session.

3. The method of claim 1 wherein the pre-authorized user credentials are authorized at a first initiation session of the user into the entity application on the mobile device and further stored for authenticating the user into each session on the entity application of the mobile device.

4. The method of claim 3 further comprising, prior to authenticating the user into a session:
    capturing the facial image of the user of the mobile device;
    tagging the facial image with a timestamp of the time of the capturing; and
    confirming that the facial image matches a stored facial image.

5. The method of claim 4 further comprising, in response to the confirming, authenticating the user into the session on the mobile device.

6. The method of claim 4 wherein the verifying by the central server further comprises scanning the timestamp of the facial image to verify the timestamp being within the pre-determined time to the capturing of the dynamic QR code.

7. The method of claim 6 wherein, when the timestamp is outside the pre-determined time, re-capturing by the mobile device the facial image of the user and verifying by the central server that the facial image matches the stored facial image.

8. The method of claim 7 further comprising, when the facial image does not match the stored facial image, denying the user access to the secure session.

9. The method of claim 1 wherein the computing device is a desktop computer.

10. A system for authenticating a user into a secure session on an entity application running on a computing device, the system comprising:
    a first entity application running on a first computing device, the first entity application configured to display a dynamic quick response ("QR") code on a user interface ("UI") of the first computing device for initiating the session;
    a second entity application running on a second computing device, a user of the second computing device being pre-authenticated into a session within the second entity application, a pre-authenticating comprising:
        capturing a facial image of the user of the second computing device;
        tagging a timestamp to the facial image of a time of the capturing of the facial image; and
        confirming that the facial image matches a stored facial image within an account profile of the user of the second computing device;
    a central server for operating a functionality of the first entity application and the second entity application;
    the second computing device configured to:
        capture the dynamic QR code displayed on the first computing device;
        store the dynamic QR code at the second computing device; and
        transmit the dynamic QR code, pre-authorized user credentials stored on the second computing device and the facial image of the user to the central server for authenticating, the authenticating for enabling initiating the session within the first entity application on the first computing device; and
    the central server configured to:
        receive the dynamic QR code, the pre-authorized user credentials and the facial image;
        verify an authenticity of the pre-authorized user credentials and the facial image;

verify that the timestamp is within a threshold range of time of the capturing of the dynamic QR code;

in response to a verification of the authenticity of the pre-authorized user credentials, the facial image and of the timestamp, confirm that the user of the first computing device is the user of the second computing device; and initiate the secure session on the first computing device.

11. The system of claim 10 wherein the facial image of the user is captured within a pre-determined time to the capturing of the dynamic QR code.

12. The system of claim 10 further comprising a one-time password ("OTP") application running on a third computing device, the OTP application being operated by the central server.

13. The system of claim 12 wherein the second computing device is in electronic communication with the third computing device.

14. The system of claim 13 wherein when the second computing device captures the dynamic QR code, the second computing device is further configured to transmit an electronic communication to the third computing device, the electronic communication comprising a request for a generation, by the OTP application, an OTP.

15. The system of claim 14 wherein the third computing device is configured to, in response to a receipt of the request, generate, by the OTP application, the OTP and transmit it to the second computing device.

16. The system of claim 14 wherein the OTP is displayed on a face of the third computing device and the second computing device is configured to trigger an input of the OTP.

17. The system of claim 15 wherein, following transmission of the OTP from the third computing device to the second computing device, the second computing device is further configured to transmit the OTP together with the dynamic QR code, the pre-authorized user credentials and the facial image to the central server for verification.

18. The system of claim 17 wherein the first computing device is a desktop computer, the second computing device is a mobile device and the third computing device is a smartwatch.

19. A method for authenticating a user into a secure session on an entity application running on a first computing device, the authenticating using a second computing device of the user as an authenticator, the method comprising:

capturing, by the second computing device, a dynamic quick response ("QR") code displayed on a first computing device, the dynamic QR code being displayed within a web browser associated with the entity application;

following the capturing, transmitting an electronic communication to a third computing device comprising a request for a generation of a one-time password ("OTP") by an OTP application running on the third computing device;

in response to a receipt of the request at the third computing device, generating, by the OTP application, the OTP;

transmitting the OTP to the second computing device;

retrieving, via the mobile device, from secure storage on the second computing device:
pre-authorized user credentials for authentication of the user into an entity application running on the second computing device; and
a facial image of the user captured within a pre-determined time to the capturing of the dynamic QR code;

transmitting the dynamic QR code, the pre-authorized user credentials, the facial image and the OTP to a central server, the transmitting for verifying the user of the first computing device being the user of the second computing device and the user of the third computing device; and in response to the verifying the dynamic QR code, the pre-authorized user credentials, the facial image and the OTP, authenticating the first computing device into the secure session.

20. The method of claim 19 wherein the first computing device is a desktop computer, the second computing device is a mobile device and the third computing device is a smartwatch.

* * * * *